Figure 1:
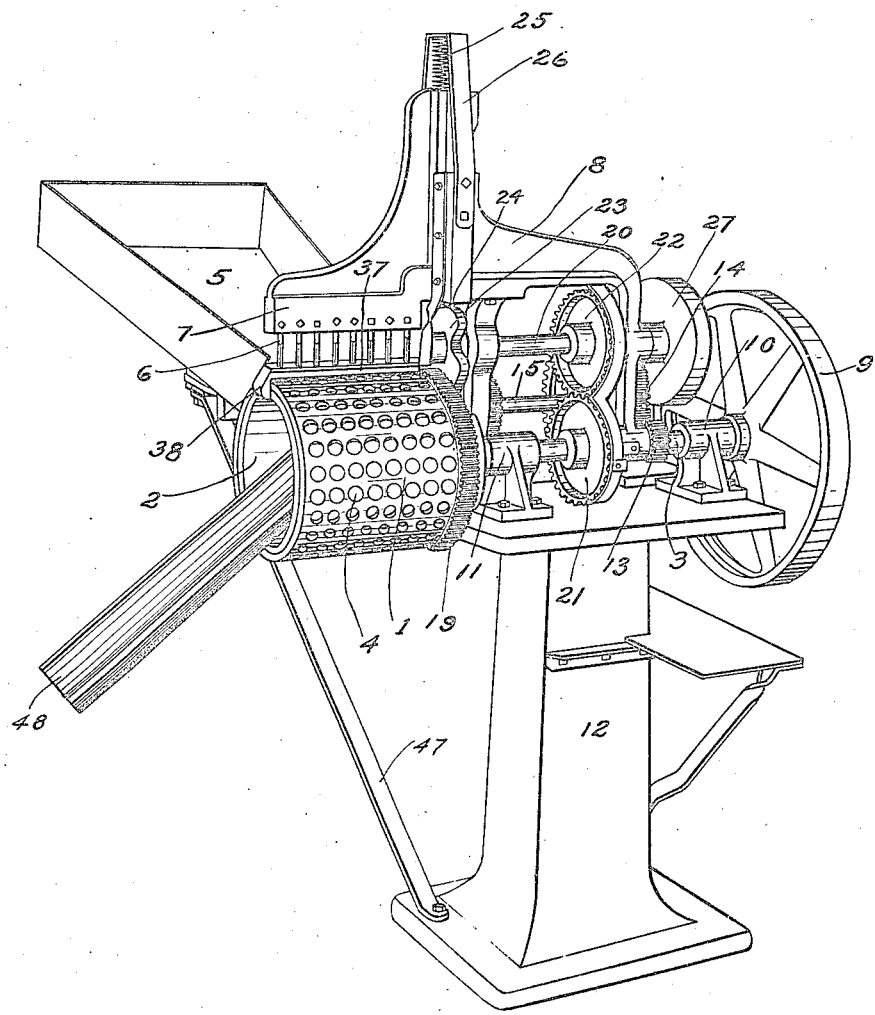

O. COLBORNE & D. W. SMITH.
FRUIT PITTING MACHINE.
APPLICATION FILED MAR. 23, 1914.

1,136,509.

Patented Apr. 20, 1915.
3 SHEETS—SHEET 1.

Witnesses:
Walter F. Stone.
Robert S. Martin

Inventors
Oliver Colborne & Dennis W. Smith,
By Rummler & Rummler,
Attys.

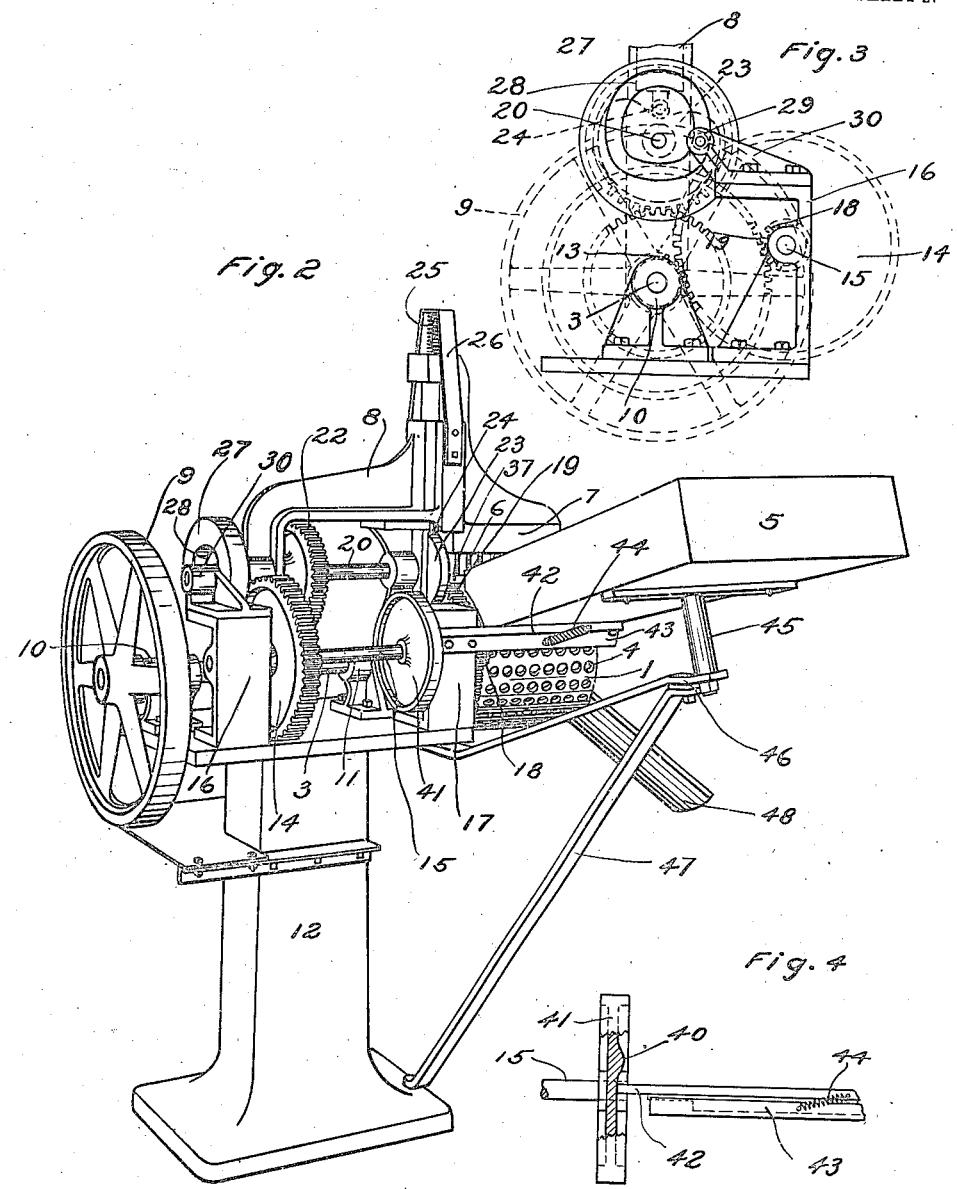

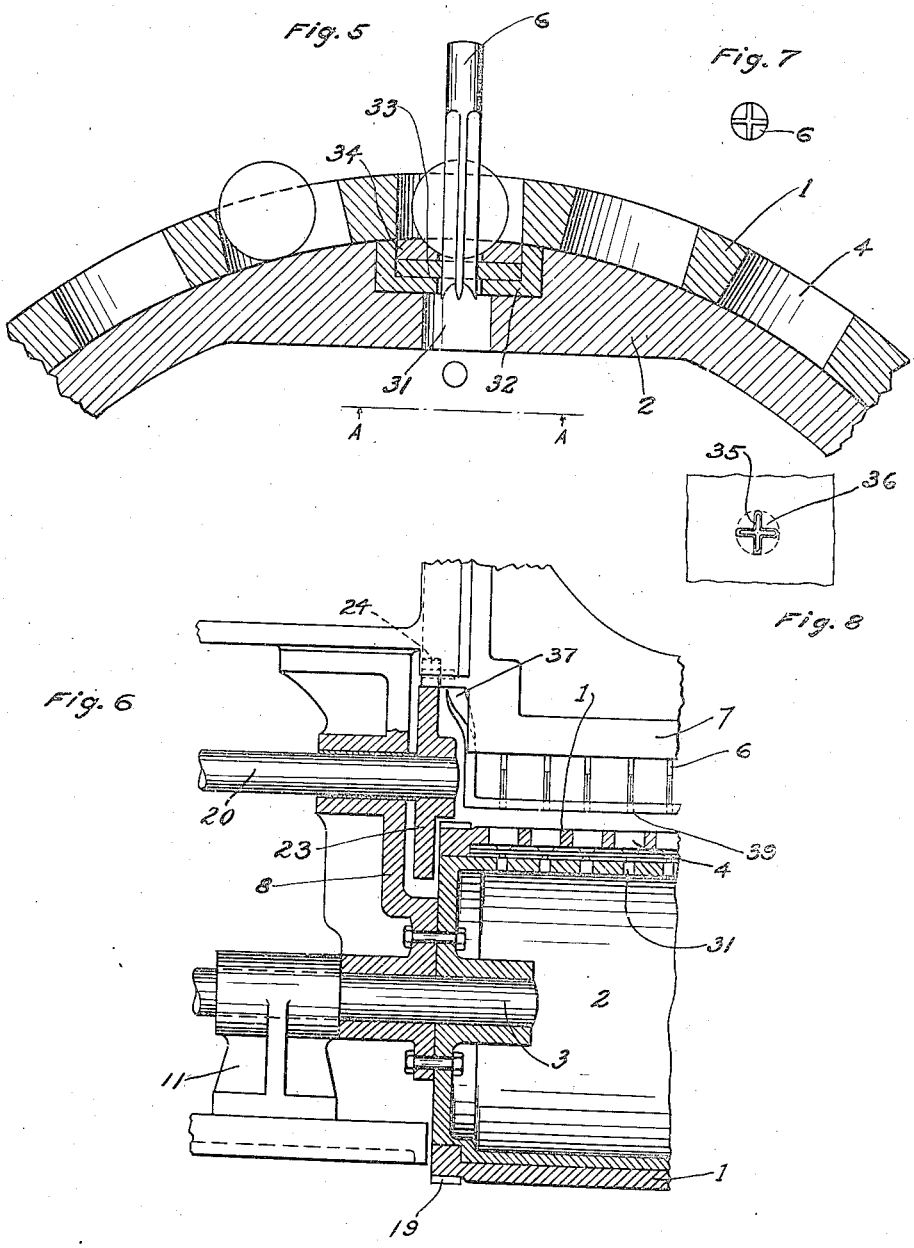

UNITED STATES PATENT OFFICE.

OLIVER COLBORNE AND DENNIS W. SMITH, OF CHICAGO, ILLINOIS, ASSIGNORS TO COLBORNE MANUFACTURING COMPANY, OF CHICAGO, ILLINOIS, A CORPORATION OF ILLINOIS.

FRUIT-PITTING MACHINE.

1,136,509.      Specification of Letters Patent.      Patented Apr. 20, 1915.

Application filed March 23, 1914. Serial No. 826,607.

*To all whom it may concern:*

Be it known that we, OLIVER COLBORNE and DENNIS W. SMITH, citizens of the United States of America, and residents of Chicago, county of Cook, and State of Illinois, have invented certain new and useful Improvements in Fruit-Pitting Machines, of which the following is a specification.

The main objects of this invention are to provide an improved form of a fruit pitting machine, especially designed for pitting cherries; and to provide an improved construction for machines of this kind whereby the fruit may be carried by a continuously traveling carrier and the pitting operation accomplished in such manner that the carrier may travel at the maximum speed at which fruit can be properly supplied to it.

An illustrative embodiment of this invention, as applied to a cherry pitter, is shown in the accompanying drawings, in which:

Figure 1 is a front perspective view of the complete machine. Fig. 2 is a rear perspective view of the same. Fig. 3 is a side view of the upper portion of the machine showing the arrangement of the driving mechanism, some of the parts in the background being omitted for the sake of clearness. Fig. 4 is a fragmentary detail of the shaking mechanism for the hopper. Fig. 5 is an enlarged fragmentary sectional detail of the drum showing the manner in which the pit is removed from a cherry. Fig. 6 is an enlarged fragmentary sectional detail of the drum and plungers as viewed from the plane of the plungers. Fig. 7 is a bottom plan view of one of the plungers. Fig. 8 is a fragmentary view taken on the line A—A of Fig. 5.

In the construction shown in the drawings, a drum 1 is rotatably mounted on a supporting cylinder 2 carried on the shaft 3. The drum 1 is provided with a series of rows of apertures 4 arranged around the periphery thereof and adapted to receive the fruit from the hopper or pan 5. A plurality of pitting plungers 6 are carried by an arm or cross-head 7 reciprocatably mounted on the frame 8 and arranged above the drum 1, so that the plungers register respectively with a row of apertures 4.

The driving mechanism for operating the drum 1 and plungers 6 comprises a driving wheel 9 secured to the shaft 3 which is journaled on the bearings 10 and 11 mounted on the supporting base 12. A pinion 13 is secured to the shaft 3 and meshes with a gear 14 carried on the shaft 15, which is journaled in bearings 16 and 17 also supported on the base 12. A pinion 18 Figs. 2 and 3 is keyed to the shaft 15 and meshes with the gear 19 herein shown to be integrally formed on the drum 1.

The pitting mechanism is operated by a cam 23 carried on a shaft 20, which is journaled on the frame 8 and driven from the shaft 3 by the gears 21 and 22. The cam 23 engages a roller 24 (Fig. 3) carried on the cross-head 7, and shifts the cross-head up and down against the action of the spring 25 bearing between said cross-head and a strap 26 embracing the upper part of the cross-head and secured to the frame 8. A second cam 27 is secured to the opposite end of the shaft 20 and has a cam slot 28 formed therein, in which travels a roller 29 journaled on the arm 30 secured to the bearing 16. The form of the cam slot 28 is such that it will coact with the roller 29 to cause the frame 8 to swing in synchronism with the drum 1 during a part of its angular movement when the pitting operation is taking place.

The cylinder or drum bottom 2 is bolted to the frame 8, so that it is also caused to move angularly with the drum 1 during the pitting operation. A row of apertures 31 is formed in the cylinder 2, so as to successively register with the rows of apertures 4 during the time that the pitting plungers 6 are being forced through the fruit. A channel-shaped bar 32 is mounted in a slot in the drum 2 above the rows of apertures 31, and has a strip of flexible material 33, such as rubber or leather secured therein by means of a plate 34. The strip 33 has slots 35 (Fig. 8) formed therein to correspond with the cross-sectional shape of the pitting plungers 6, so as to provide flexible shoulders 36 (Fig. 8) which help support the cherry and wipe the pitting plungers 6 free of any fruit that may hang thereto after passing through the cherry. The bar 32 and plate 34 are provided with circular apertures registering with the apertures 31. The plate 34 is also counterbored, as shown in Fig. 5, so as to center the cherry in the apertures 4.

A bar 37 is fastened at its inner end to the frame 8, and at its outer end to a fitting 38 carried on the cylinder 2, and is arranged above the drum 1 below the pitting plungers 6. Apertures 39 are formed in the bar 37 in registration with the pitting plungers 6. The bar 37 is adapted to remove the fruit from the plungers 6 when they are drawn upwardly after the pitting operation, in case the pitted fruit has a tendency to adhere thereto.

The pan or hopper 5 is shifted back and forth so as to shake the fruit down toward the drum 1, whereby it is caused to enter into the apertures 4 to be carried into position to be pitted. The shaking of the hopper 5 is effected by means of shoulders 40 formed or secured on the face of a disk 41, and adapted to engage the end of an arm 42 shiftably supported on a rail or bar 43. The arm 42 is attached to the bottom of the hopper 5, and the bar 43 is rigidly secured to the bearing 17. A spring 44, connected to the arm 42 and bar 43 normally urges the arm 42 against the face of the disk 41. The disk 41 is rotatably secured to the shaft 15. The hopper is also supported on a shaft or rod 45, secured to the bottom thereof and journaled in the end of a brace 46 secured to the frame 12 and supported by a brace 47.

A suitable trough 48 is secured to the cylinder 2 and extends into the interior thereof, so as to receive the pits as they are forced from the fruit and direct them into a suitable pan or vessel placed below the end thereof. The fruit after having been pitted drops from the drum during its rotation into a suitable receptacle placed on the floor below.

The operation of the device is as follows: As the drum rotates cherries fall into the rows of apertures 4, and as a row is brought into alinement with the row of pitting plungers 6 the depression in the cam 23 moves into position to receive the roller 24 and allows the spring 25 to depress the cross-head 7. The downward movement of the cross-head causes the pitting plungers 6 to be carried through the fruit so as to force the pits therefrom. As the cross-head 7 is thus being moved downwardly, the cam slot 28 acting on the roller 29 causes the frame 8 to rock in synchronism with the angular movement of the drum 4. As soon as the pitting plungers 6 have forced the pits from the fruit, the cam 23 acting on the roller 24 elevates the cross-head 7 so as to withdraw the plungers 6. Such fruit as adheres to the plungers 6 as they are withdrawn is removed by the bar 37. At the instant the plungers 6 are free from the drum 1, the cam 27 causes the frame 8 to swing back into position to register with the succeeding row of apertures 4, whereupon the operation is repeated. The pits and pitted fruit fall into separate receptacles as hereinbefore explained.

By reason of the rolling action of the gear 22 on the gear 21, when the frame 8 is rocked, the rotation of the shaft 3 is retarded during the forward movement of the frame 8 and is increased during the return movement of said frame over what it is when the frame is at rest. This, of course, affects the action of the cam 27 with the result that the frame 8 swings back more rapidly than it moves forward. Thus the pitter frame moves forward at the same speed as the carrier during the pitting operation, and then quickly returns to a position to register with the next succeeding row of fruit cells.

Although but one specific embodiment of this invention has been herein shown and described, it will be understood that numerous details of the construction shown may be altered or omitted without departing from the spirit of this invention as defined by the following claims.

We claim:

1. In a fruit pitting machine, the combination of a traveling carrier adapted for continuous movement in one direction and having a series of fruit cells arranged in the direction of travel thereof, a pitting plunger adapted to remove pits from the fruit in said cells, and mechanism for reciprocating said plunger into and out of said cells, and for causing said plunger to travel with the carrier during each pitting operation.

2. In a fruit pitting machine, the combination of a traveling carrier adapted for continuous movement in one direction and having a series of fruit cells arranged in the direction of travel thereof, a pitting plunger adapted to remove pits from the fruit in said cells, and mechanism for reciprocating said plunger into and out of said cells, and for causing said plunger to also travel forward and back in the direction of travel of the carrier so as to register with successive cells during successive pitting operations.

3. In a fruit pitting machine, the combination of a movable carrier adapted for continuous movement in one direction and having a series of apertures therein extending in the direction of movement of said carrier, a bottom member adapted to support fruit in said apertures, a pitting plunger adapted to drive a pit through the fruit and said bottom member, and mechanism for reciprocating said plunger and for causing said plunger to travel with said carrier during the pitting operation.

4. In a fruit pitting machine, the combination of a rotatable carrier having a peripheral series of apertures therein for supporting fruit, a pitting plunger movable into and out of said apertures for removing the pits from the fruit contained therein, and means supporting said plunger and adapted to cause the same to travel with said carrier during the pitting operation.

5. In a fruit pitting machine, the combination of a cylindrical carrier having in its periphery a series of rows of apertures each adapted for supporting fruit, a cross-head mounted above said carrier, a series of pitting plungers carried by said cross-head and arranged to register with said rows of apertures, mechanism for continuously rotating said carrier and for simultaneously oscillating said cross-head angularly about the axis of said carrier, whereby said pitting plungers travel in fixed angular relation with said carrier during each pitting operation, and are swung back to register with a succeeding row of apertures between successive operations of said cross-heads.

6. In a fruit pitting machine, the combination of a rotatable carrier having therein an annular series of rows of fruit cells, a frame mounted to oscillate angularly about the axis of said carrier, a cross-head mounted on said frame and movable radially with respect to said carrier, a series of pitting plungers mounted on said cross-head to register with said rows of cells, and mechanism adapted and arranged to reciprocate said cross-head radially for discharging the pits from the fruit in said cells, said mechanism being also adapted to oscillate said frame so as to cause the same to travel at substantially the same angular speed as said carrier during each pitting operation and to swing back between pitting operations to carry said pitting plungers successively into position for operating in different rows of cells.

7. In a fruit pitting machine, the combination of a rotatable carrier having therein an annular series of rows of fruit cells, a frame mounted to oscillate angularly about the axis of said carrier, a cross-head mounted on said frame and movable radially with respect to said carrier, a series of pitting plungers mounted on said cross-head to register with said rows of cells, and mechanism adapted and arranged to reciprocate said cross-head radially for discharging the pits from the fruit in said cells, said mechanism being also adapted to oscillate said frame so as to cause the same to travel at substantially the same angular speed as said carrier during each pitting operation and to swing back at greater speed between pitting operations to carry said pitting plungers successively into position for operating in different rows of cells.

8. In a fruit pitting machine, the combination of a rotatable carrier having therein an annular series of rows of fruit cells, a frame mounted to oscillate angularly about the axis of said carrier, a cross-head mounted on said frame and movable radially with respect to said carrier, a series of pitting plungers mounted on said cross-head to register with said rows of cells, mechanism adapted and arranged to reciprocate said cross-head radially for discharging the pits from the fruit in said cells, said mechanism being also adapted to oscillate said frame so as to cause the same to travel at substantially the same angular speed as said carrier during each pitting operation and to swing back between pitting operations to carry said pitting plungers successively into position for operating in different rows of cells, and a perforated bottom member adapted to support the fruit in the cells of said carrier and movable with said frame.

9. In a fruit pitting machine, the combination of a supporting member, a shaft journaled on said member, a drum mounted so as to be rotated by said shaft, said drum having series of rows of fruit cells formed therein, a frame oscillatively mounted on said shaft, a cross-head reciprocatably mounted on said frame, a plurality of pitting plungers carried by said cross-head and adapted to register with said rows of cells, a pair of cams operated by said shaft and respectively adapted to reciprocate said cross-head radially of said drum for discharging pits from the fruit in said cells and to oscillate said frame during the rotation of said drum, and means for driving said shaft.

10. In a fruit pitting machine, the combination of a supporting member, a shaft journaled on said member, a drum mounted so as to be rotated by said shaft, said drum having series of rows of fruit cells formed therein, a frame oscillatively mounted on said shaft, a cross-head reciprocatably mounted on said frame, a plurality of pitting plungers carried by said cross-head and adapted to register with said rows of cells, a shaft journaled on said frame, gears connecting said shafts, a cam carried on said shaft and adapted to engage said cross-head for reciprocating the same radially of said drum for discharging pits from the fruit in said cells, a second cam carried by said second shaft, a part carried by said supporting member and coacting with said second cam to oscillate said frame to cause the same to travel at substantially the same angular speed as said drum during each pitting operation and to swing back between pitting operations so as to carry said pitting plungers successively into position for operating in different rows of said cells, and means for driving said first mentioned shaft.

11. In a fruit pitting machine, the combination of a supporting member, a shaft journaled on said member, a drum mounted so as to be rotated by said shaft, said drum having series of rows of fruit cells formed therein, a frame oscillatively mounted on said shaft, a cross-head reciprocatably mounted on said frame, a plurality of pitting plungers carried by said cross-head and adapted to register with said rows of cells, a shaft journaled on said frame, gears connecting said shafts, a cam carried on said shaft and adapted to engage said cross-head for reciprocating the same radially of said drum for discharging pits from the fruit in said cells, a second cam carried by said second shaft, a part carried by said supporting member and coacting with said second cam to oscillate said frame to cause the same to travel at substantially the same angular speed as said drum during each pitting operation and to swing back between pitting operations so as to carry said pitting plungers successively into position for operating in different rows of said cells, said gears and second cam being adapted to cause said frame to swing forward at the same angular speed as said drum and to return at a greater angular speed than that of its forward movement, and means for driving said first mentioned shaft.

12. In a fruit pitting machine, the combination of a supporting member, a shaft journaled on said member, a frame oscillatively mounted on said shaft, a cylinder journaled on said shaft and rigidly secured to said frame, a drum rotatably mounted on said cylinder and having therein an annular series of rows of fruit cells, said cylinder having a row of apertures therein adapted to register with said rows of cells, a cross-head reciprocatably mounted on said frame, a plurality of pitting plungers carried by said cross-head and adapted to register with said rows of cells, a shaft journaled on said rows of cells, a shaft journaled on said frame, gears connecting said shafts, a cam on said shaft and adapted to engage said cross-head for reciprocating said pitting plungers radially of said drum, a second cam rotated by said shaft, a part on said supporting member coacting with said second cam to oscillate said frame and cause the same to travel at substantially the same angular speed as said drum during each pitting operation and to swing back between pitting operations to carry said pitting plungers successively into registry with different rows of cells, a third shaft journaled on said member, gears connecting said third shaft with said first mentioned shaft and with said drum, and means for driving said first mentioned shaft.

13. In a fruit pitting machine, the combination of a traveling carrier having a series of fruit cells arranged in the direction of travel thereof, a pitting plunger adapted to remove pits from the fruit in said cells, mechanism for reciprocating said plunger into and out of said cells, and for causing said plunger to travel with the carrier during each pitting operation, a fruit hopper arranged adjacent to said carrier and adapted to direct fruit into said cells, a reciprocating arm carrying said hopper, and a cam adapted to engage said arm so as to vibrate said hopper.

Signed at Chicago this 21st day of March 1914.

OLIVER COLBORNE.
DENNIS W. SMITH.

Witnesses:
EDWIN PHELPS,
M. IRENE HUTCHINGS.